(12) United States Patent      (10) Patent No.:   US 12,675,702 B2

Hoang           (45) Date of Patent:      Jul. 7, 2026

(54) FEATURE ENHANCEMENT VIA UNSUPERVISED LEARNING OF EXTERNAL KNOWLEDGE EMBEDDING

(71) Applicant: INTERNATIONAL BUSINESS MACHINES CORPORATION, Armonk, NY (US)

(72) Inventor: Thanh Lam Hoang, Maynooth (IE)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 16/950,598

(22) Filed: Nov. 17, 2020

(65)        Prior Publication Data

US 2022/0156594 A1     May 19, 2022

(51) Int. Cl.
    *G06N 5/02*         (2023.01)
    *G06F 18/20*       (2023.01)
          (Continued)

(52) U.S. Cl.
    CPC ........... *G06N 3/088* (2013.01); *G06F 18/213* (2023.01); *G06F 18/241* (2023.01); *G06F 18/29* (2023.01); *G06F 18/40* (2023.01); *G06N 5/02* (2013.01)

(58) Field of Classification Search
None
See application file for complete search history.

(56)        References Cited

U.S. PATENT DOCUMENTS

| | | |
|---|---|---|
| 8,364,613 B1 | 1/2013 | Lin |
| 9,229,988 B2 | 1/2016 | Vadrevu |

(Continued)

FOREIGN PATENT DOCUMENTS

| | | |
|---|---|---|
| CN | 109408591 A | 3/2019 |
| CN | 109446251 A | 3/2019 |

(Continued)

OTHER PUBLICATIONS

Atzmueller, et al., "Mixed-Initiative Feature Engineering Using Knowledge Graphs," 9th K-CAP 2017: Austin, TX, USA, Dec. 4-6, 2017, ACM 2017, 45:1-45:4, 4 pages [online], [retrieved on May 21, 2020]. Retrieved from the Internet <https://dl.acm.org/doi/10.1145/3148011.3154473>.

Bordes, et al., "Translating Embeddings for Modeling Multi-relational Data," NIPS, 1 page [online], [retrieved on Nov. 16, 2020]. Retrieved from the Internet <https://papers.nips.cc/paper/2013/hash/1cecc7a77928ca8133fa24680a88d2f9-Abstract.html>.

(Continued)

*Primary Examiner* — David R Vincent

(74) *Attorney, Agent, or Firm* — Anthony Curro

(57)          ABSTRACT

A method, computer system, and computer program product for enhancing feature engineering based on unsupervised learning of associated external knowledge embedding are provided. The embodiment may include receiving, by a processor, input data as a table and a name of a column. The embodiment may also include analyzing the column to identify multisets of concepts or sequences of concepts. The embodiment may further include automatically expanding the column by linking the identified multisets or the sequences of the concepts with corresponding concepts in an external knowledge graph. The embodiment may also include training a neural network to learn embedding vectors of concept multi-sets in the expanded column of the tables, wherein the training is unsupervised without provision of labels of data when the neural network learns an embedding of the multisets of concepts with an objective to minimize a reconstruction error of the identified multisets of concepts.

20 Claims, 7 Drawing Sheets

(51) Int. Cl.
| | |
|---|---|
| *G06F 18/213* | (2023.01) |
| *G06F 18/241* | (2023.01) |
| *G06F 18/40* | (2023.01) |
| *G06N 3/088* | (2023.01) |

(56) References Cited

U.S. PATENT DOCUMENTS

| | | | |
|---|---|---|---|
| 9,547,701 | B2 | 1/2017 | Lightner |
| 9,773,209 | B1 | 9/2017 | Champaneria |
| 9,773,253 | B2 | 9/2017 | Nikolayev |
| 10,310,718 | B2 | 6/2019 | Multani |
| 10,410,138 | B2 | 9/2019 | Maor |
| 10,489,722 | B2 | 11/2019 | Farré Guiu |
| 11,599,826 | B2 | 3/2023 | Khurana |
| 2012/0158791 | A1 | 6/2012 | Kasneci |
| 2012/0284212 | A1 | 11/2012 | Lin |
| 2015/0112606 | A1 | 4/2015 | He |
| 2016/0277423 | A1 | 9/2016 | Apostolescu |
| 2017/0337486 | A1 | 11/2017 | Zang |
| 2018/0089424 | A1 | 3/2018 | Yang |
| 2018/0101533 | A1 | 4/2018 | Robichaud |
| 2018/0203918 | A1 | 7/2018 | Chen |
| 2019/0050465 | A1 | 2/2019 | Khalil |
| 2019/0251467 | A1 | 8/2019 | Lokare |
| 2019/0304603 | A1 | 10/2019 | Takata |
| 2020/0134579 | A1 | 4/2020 | Almukaynizi |
| 2020/0210867 | A1 | 7/2020 | Banis |
| 2021/0004715 | A1 | 1/2021 | Neumann |
| 2021/0216904 | A1 | 7/2021 | Khurana |
| 2021/0312041 | A1* | 10/2021 | Gururajan ............. G06F 21/554 |

FOREIGN PATENT DOCUMENTS

| | | | |
|---|---|---|---|
| CN | 109657918 | A | 4/2019 |
| CN | 2019129060 | A1 | 7/2019 |
| CN | 2019137444 | A1 | 7/2019 |
| CN | 110728541 | A | 1/2020 |

OTHER PUBLICATIONS

Bougie, et al., "Deep Reinforcement Learning Boosted by External Knowledge," SAC 2018, Proceedings of the 33rd Annual ACM Symposium on Applied Computing, arXiv:1712.04101v1[cs.LG], Dec. 12, 2017, 8 pages.

Cheng, et al., "Automated Feature Generation from Structured Knowledge," The 20th ACM Conference on Information and Knowledge Management, Jan. 2011, CIKM '11, Oct. 24-28, 2011, Glasgow, Scotland, UK, ACM 978-1-4503-0717-8/11/10, 10 pages.

Friedman, et al., "Recursive Feature Generation for Knowledge-based Learning," Journal of Artificial Intelligence Research 1 (2015) 3-17, arXiv:1802.00050v1[cs.AI], Jan. 31, 2018, 23 pages.

Galhotra, et al., "Automated Feature Enhancement for Predictive Modeling Using External Knowledge," 2019 International Conference on Data Mining Workshops (ICDMW), Nov. 8-11, 2019, IEEE, Jan. 13, 2020, 2 pages [online], [retrieved on May 21, 2020]. Retrieved from the Internet <https://ieeexplore.ieee.org/abstract/document/8955651>.

He, et al.; "AutoML: A Survey of The State-Of-The-Art", arXiv:1908.00709v2 [cs.LG], Aug. 14, 2019, 17 pages.

Joulin, et al., "Fast Linear Model for Knowledge Graph Embeddings," 6th Workshop on Automated Knowledge Base Construction (AKBC), arXiv:1710.10881v1[stat.ML], Oct. 30, 2017, 2 pages [online], [retrieved on May 21, 2020]. Retrieved from the Internet <https://mnick.github.io/publication/joulin2017fast/>.

Kanter, et al., "Deep Feature Synthesis: Towards Automating Data Science Endeavors," 2015 IEEE International Conference on Data Science and Advanced Analytics (DSAA), Paris, 2015, pp. 1-10, [online] [retrieved on May 26, 2020]. Retrieved from the Internet <https://ieeexplore.ieee.org/document/7344858> <doi: 10.1109/DSAA.2015.7344858>.

Khurana, et al., "Cognito: Automated Feature Engineering for Supervised Learning," 2016 IEEE Dec. 12-15, 2016, 16th International Conference on Data Mining Workshops (ICDMW), Barcelona, 2016, pp. 1304-1307 [online], [retrieved on Oct. 12, 2020]. Retrieved from the Internet <https://ieeexplore.ieee.org/document/7836821> <doi:0.1109/ICDMW.2016.0190>,.

Khurana, et al., "Feature Engineering for Predictive Modeling Using Reinforcement Learning," AAAI Conference on Artificial Intelligence Thirty-Second AAAI Conference on Artificial Intelligence, 3407-3414, [online], [Retrieved on Nov. 17, 2020]. Retrieved from the Internet <https://www.aaai.org/ocs/index.php/AAAI/AAAI18/paper/view/16564/16719>.

Lam, et al., "Learning Features for Relational Data," arXiv:1801.05372v1 [cs.AI], https://arxiv.org/pdf/1801.05372v1.pdf, Jan. 16, 2018, 12 pages.

Mell et al., "The NIST Definition of Cloud Computing", National Institute of Standards and Technology, Special Publication 800-145, Sep. 2011, pp. 1-7.

Nargesian, et al., "Learning Feature Engineering for Classification," Proceedings of the Twenty-Sixth International Joint Conference on Artificial Intelligence (IJCAI-17), 2017, pp. 2529-2535.

Pending U.S. Appl. No. 16/741,084, filed Jan. 13, 2020, entitled, "Knowledge Aided Feature Engineering", 45 pages.

Re, et al., "Feature Engineering for Knowledge Base Construction", arXiv:1407.6439v3 [cs.DB], Sep. 18, 2014, 14 pages.

Lam, et al., Feature Learning From Relational Database, arXiv, arXiv:1801.05372v4, Jun. 15, 2019, https://arxiv.org/abs/1801.05372, pp. 1-15.

\* cited by examiner

100

CLIENT COMPUTING DEVICE
102

PROCESSOR
104

DATA STORAGE
DEVICE 106

SOFTWARE
PROGRAM
108

AUTOMATED
FEATURE
ENGINEERING
PROGRAM
110A

NETWORK   114

SERVER 112

AUTOMATED
FEATURE
ENGINEERING
PROGRAM
110B

DATABASE
116

200

START

Determine a column where a user wants to associate the column information with external knowledge. 202

Link each concepts in the columns to knowledge graph concepts. 204

Create an expanded column with associated concepts from the knowledge graph. 206

Use a set embedding neural network for learning embedding vectors of the expanded columns. 208

End

FEATURE ENHANCEMENT VIA UNSUPERVISED LEARNING OF EXTERNAL KNOWLEDGE EMBEDDING

BACKGROUND

The present invention relates, generally, to the field of computing, and more particularly to feature engineering.

Feature engineering is a process of using domain knowledge to extract features from raw data via data mining techniques to improve the performance of machine learning algorithms. In machine learning and pattern recognition, a feature is an individual measurable property or characteristic of a phenomenon being observed or an attribute or property shared by all of the independent units on which analysis or prediction is to be done. In pattern recognition, classification and regression, selecting informative, discriminating and independent features is one of the most important steps for the perspective algorithms. Features may be numeric, but structural features such as strings and graphs may be used as well. Domain knowledge may refer to knowledge of a specific, specialized discipline or field. For example, in software engineering, domain knowledge is knowledge about the environment in which the target system operates.

SUMMARY

According to one embodiment, a method, computer system, and computer program product for enhancing feature engineering based on unsupervised learning of associated external knowledge embedding are provided. The embodiment may include receiving, by a processor, input data as a table and a name of a column. The embodiment may also include analyzing the column to identify multisets of concepts or sequences of concepts. The embodiment may further include automatically expanding the column by linking the identified multisets or the sequences of the concepts with corresponding concepts in an external knowledge graph. The embodiment may also include training a neural network to learn embedding vectors of concept multi-sets in the expanded column of the tables, wherein the training is unsupervised without provision of labels of data when the neural network learns an embedding of the multisets of concepts with an objective to minimize a reconstruction error of the identified multisets of concepts.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
FIG. 1 illustrates an exemplary networked computer environment according to at least one embodiment.
Figure 1:
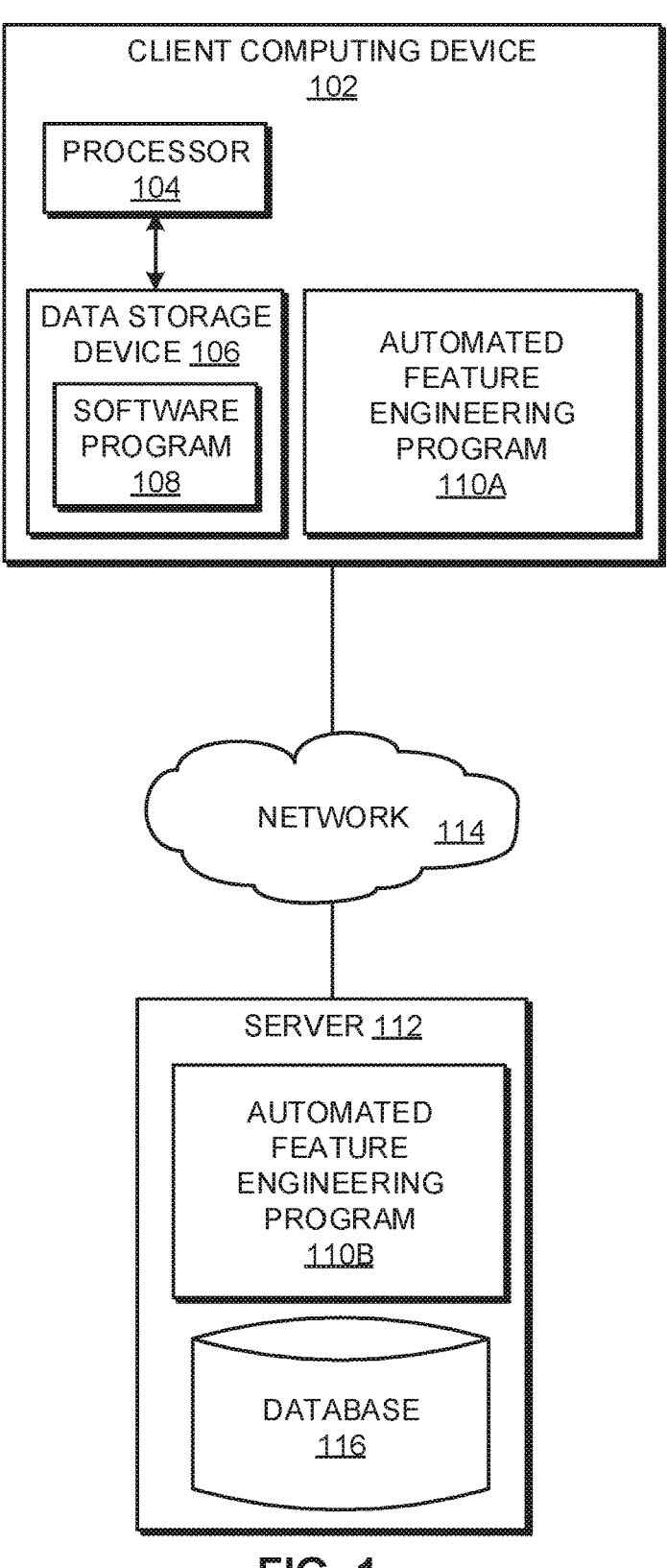

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to feature engineering. The following described exemplary embodiments provide a system, method, and program product to connect information form data to an external knowledge base to collect the knowledge in a form of a set or a multi-set of items and generating an embedding vector of the set (multi-set) of items using a neural network. The embedding of the knowledge base in the form of a multi-set of items (concepts) is learned unsupervised. Therefore, it does not require labeled data to learn a good representation of the concepts. The embedding vectors of these concepts are useful for other predictive analytics tasks and data mining tasks including classification/regression problems, anomaly detection and data clustering because it provides useful contextual information from external knowledge graphs.

As previously described, feature engineering is a process of using domain knowledge to extract features from raw data via data mining techniques to improve the performance of machine learning algorithms. In machine learning and pattern recognition, a feature is an individual measurable property or characteristic of a phenomenon being observed or an attribute or property shared by all of the independent units on which analysis or prediction is to be done. In pattern recognition, classification and regression, selecting informative, discriminating and independent features is one of the most important steps for the perspective algorithms. Features may be numeric, but structural features such as strings and graphs may be used as well. Domain knowledge may refer to knowledge of a specific, specialized discipline or field. For example, in software engineering, domain knowledge is knowledge about the environment in which the target system operates.

Feature engineering is known as one of the most time-demanding task in a data science pipeline. In order to perform feature engineering manually, data scientists may need to use domain knowledge to extract relevant features from data. As such, it may be advantageous to, among other things, implement a system capable of extracting relevant features from data automatically using external knowledge.

According to one embodiment, the claimed invention receives data and link the data to an external knowledge base. The linked knowledge may be then collected in a form of set of items. The claimed invention may also learn an embedding of the given set in an unsupervised manner. The embedding vector then may be used as additional features for supervised learning tasks.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for enhancing feature engineering based on unsupervised learning of embedding of external knowledge associated with original domain knowledge from which relevant features need to be extracted.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an automated feature engineering program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an automated feature engineering program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the automated feature engineering program 110A, 110B may be a program capable of determining a column where a user wants to associate the column information with external knowledge, linking each concepts in the columns to knowledge graph concepts, creating an expanded column with associated concepts from the knowledge graph and using a neural network to learn embedding vectors of the expanded columns. The automated feature engineering process is explained in further detail below with respect to FIG. 2.

Figure 2:
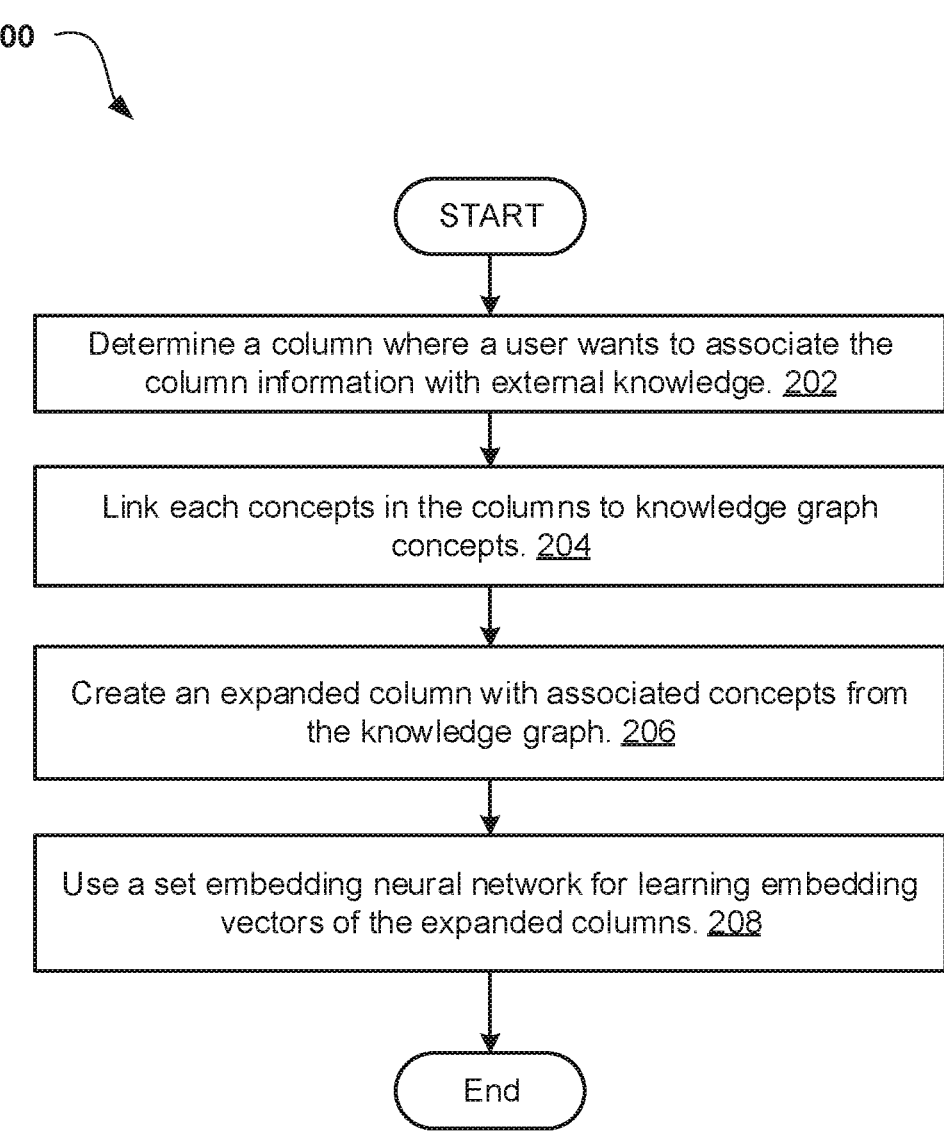
FIG. 2 is an operational flowchart illustrating an automated feature engineering process according to at least one embodiment.

FIG. 2 is an operational flowchart illustrating an automated feature engineering process 200 according to at least one embodiment. At 202, the automated feature engineering program 110A, 110B determines a column where a user wants to associate the column information with external knowledge. According to one embodiment, the automated feature engineering program 110A, 110B may receive a knowledge graph in triples of a form, such as subject, predicate, object. For example, "fridge", "isInstanceOf", "Kitchen_Appliances", "bicycle", "isInstanceOf", "Vehicle", and "oven", "isInstanceOf", "Kitchen_Appliances". In another embodiment, the automated feature engineering program 110A, 110B may take a table as an input and allow a user to specify a column where the user wants to associate the column information with external knowledge. For example, the automated feature engineering program 110A, 110B may take the following exemplary training data as an input data table.

TABLE 1

| | | Training Data | | |
|---|---|---|---|---|
| Place_id | concepts | Size (meter square) | Avg temperature | label |
| 1 | car, person, bicycle | 200 | 12 | outdoor |
| 2 | person, person, fridge, table | 10 | 23 | kitchen |
| 3 | oven, chair | 200 | 22 | kitchen |
| 4 | bus, person | 100 | 32 | outdoor |

For example, we have a training data given as a table with multiple columns. In this table we have one or more columns associated with sets of concepts. For instance, the concepts column contains concepts associated with the given place. In addition to the concepts we also have other numerical columns such as size and average temperature. If the concepts are "person, motor bike" and "dish-washer, cooler", it is not easy for machine learning to classify said data into any of the example "labels" above as said test data has some concepts such as "motor bike", "cooker" and "dishwasher" that are not included the training data. However, a human knows how to classify the test data because humans have domain knowledge that a motor bike is similar to a car or a bicycle which belong to a vehicle class or concept, and a cooker is similar to an oven or a fridge, which belong to a kitchen-appliance class or concept. In this example, a user wants to select the "concepts" column so that the automated feature engineering program 110A, 110B can expand the column by associating the column information with external knowledge.

At 204, the automated feature engineering program 110A, 110B links each concept in the column to knowledge graph classes or concepts. According to one embodiment, the automated feature engineering program 110A, 110B generates or receives a knowledge graph, such as the example shown in FIG. 4. The automated feature engineering program 110A, 110B may connect "bus", "car", "bicycle" from the input data table above and "motor bike" from the above test data set to the "vehicle" class. The automated feature engineering program 110A, 110B may classify "fridge", "oven" and "cooker" into "kitchen_appliances" and "chair" and "table" into "furniture".

At 206, the automated feature engineering program 110A, 110B creates an expanded column with associated concepts from the knowledge graph. According to one embodiment, the automated feature engineering program 110A, 110B may receive the classification information from the knowledge graph and update the input data table as represented in the table 2 below.

TABLE 2

| | | Input Data Table with Expanded Column | | |
|---|---|---|---|---|
| Place_id | Expanded concepts | Size (meter square) | Avg temperature | label |
| 1 | car, person, bicycle, vehicle | 200 | 12 | outdoor |
| 2 | person, person, fridge, table, kitchen_appliance, furniture | 10 | 23 | kitchen |
| 3 | oven, chair, kitchen_appliance, furniture | 200 | 22 | kitchen |
| 4 | bus, person, vehicle | 100 | 32 | outdoor |

The automated feature engineering program 110A, 110B may add "vehicle" to "detected objects" column in the first row, "kitchen_appliance" and "furniture" to the second row, "kitchen_appliance" and "furniture" to the third row and "vehicle" to the last row, such that the original table now has the expanded information with associated concepts from the above knowledge graph.

At 208, the automated feature engineering program 110A, 110B utilizes a set-embedding neural network (Set-Net) for learning embedding vectors of the expanded columns. A set of concepts such as the set {car, person, bicycle, vehicle} in Table 2 is not the type of input on which machine learning can train. Such a type of input is unstructured while machine learning may need vectors of numerical values. Therefore, it first may be necessary to transform the given set to a vector such that machine learning models can be trained on. A set-embedding neural network is a neural network that takes input as a set of concepts. Set-Net may first transform each item in a set with an item embedding layer which may turn each item in the set into a fixed size numerical vector. According to one embodiment, the Set-Net portion of the automated feature engineering program 110A, 110B may convert the data set expanded with the associated concepts identified in the knowledge graph into vectors as represented by the following exemplary table 3. For example, the vector [0.1, 0.3, 0.3] is a numerical representation of the set {car, person, bicycle, vehicle} which may be then used for machine learning.

TABLE 3

| | | Embedding Vectors Table | | |
|---|---|---|---|---|
| Place_id | Expanded concepts embedding vectors | Size (meter square) | Avg temperature | label |
| 1 | [0.1, 0.3, 0.3] | 200 | 12 | out-door |
| 2 | [0.1, 0.3, 0.4] | 10 | 23 | kitchen |

TABLE 3-continued

| | | Embedding Vectors Table | | |
|---|---|---|---|---|
| Place_id | Expanded concepts embedding vectors | Size (meter square) | Avg temperature | label |
| 3 | [0.4, 0.3, 0.1] | 200 | 22 | kitchen |
| 4 | [0.2, 0.2, 0.2] | 100 | 32 | outdoor |

The automated feature engineering program 110A, 110B may utilize a set-embedding neural network (Set-Net) to transform the expanded columns with multi-sets of concepts into columns with numerical vectors. In yet another embodiment, the Set-Net transform a multiset (a set that allows for multiple instances of each element, i.e., items with counts of each item) by first transforming each item in the set with an item embedding layer which turns each item in the set into a fixed size numerical vector. Then these vectors are summed up to form a single vector. The sum vector then may be transformed again using a multi-layer perceptron (MLP) to output a set-embedding vector. (One of ordinary skill in the art will understand that an MLP is a class of feedforward artificial neural network In addition, one of ordinary skill will understand that when a sentence, set, or other object is mapped into a vector space, the sentence, set, or other object is represented by an embedding vector.) In at least one other embodiment, a set neural network is trained unsupervised (without provided labels) by predicting the presence of the item in the sets.

For example, for the multiset (oven, chair, kitchen_appliance, furniture), first, each item may be transformed into a vector using the item embedding layer e: (e(oven), e(chair), e(kitchen_appliance), e(furniture)). Then the automated feature engineering program 110A, 110B may calculate the sum of these vectors s=e(oven)+e(chair)+e(kitchen_appliance)+e(furniture). This sum may be transformed again using a multilayer perceptron (MLP) to get the embedding vector of the set: MLP(s). From mlp(s), the automated feature engineering program 110A, 110B may predict the occurrence of oven, chair, kitchen_appliance and furniture by minimizing a loss function measuring the distance between the vector mlp(s) to the vector e(oven), e(chair), e(kitchen_appliance) and e(furniture). This is similar to training an auto-encoder. After training the set-embedding neural network, the automated feature engineering program 110A, 110B may get an embedding vector of each multi-set of concepts as described in Table 3. The embedding vector may have fixed size (a hyper-parameter defined by users). In this example the embedding vector has size 3. The automated feature engineering program 110A, 110B may add three new columns to this table each corresponding to one dimension of these embedding vectors, which is considered as additional features for further predictive or descriptive analytics.

TABLE 4

| | Embedding Vectors Table | | | | | |
|---|---|---|---|---|---|---|
| Place_id | Expanded concepts embedding dimension 1 | Expanded concepts embedding dimension 2 | Expanded concepts embedding dimension 3 | Size (meter square) | Avg temperature | label |
| 1 | 0.1 | 0.3 | 0.3 | 200 | 12 | out-door |
| 2 | 0.1 | 0.3 | 0.4 | 10 | 23 | kitchen |
| 3 | 0.4 | 0.3 | 0.1 | 200 | 22 | kitchen |
| 4 | 0.2 | 0.2 | 0.2 | 100 | 32 | outdoor |

Figure 3:
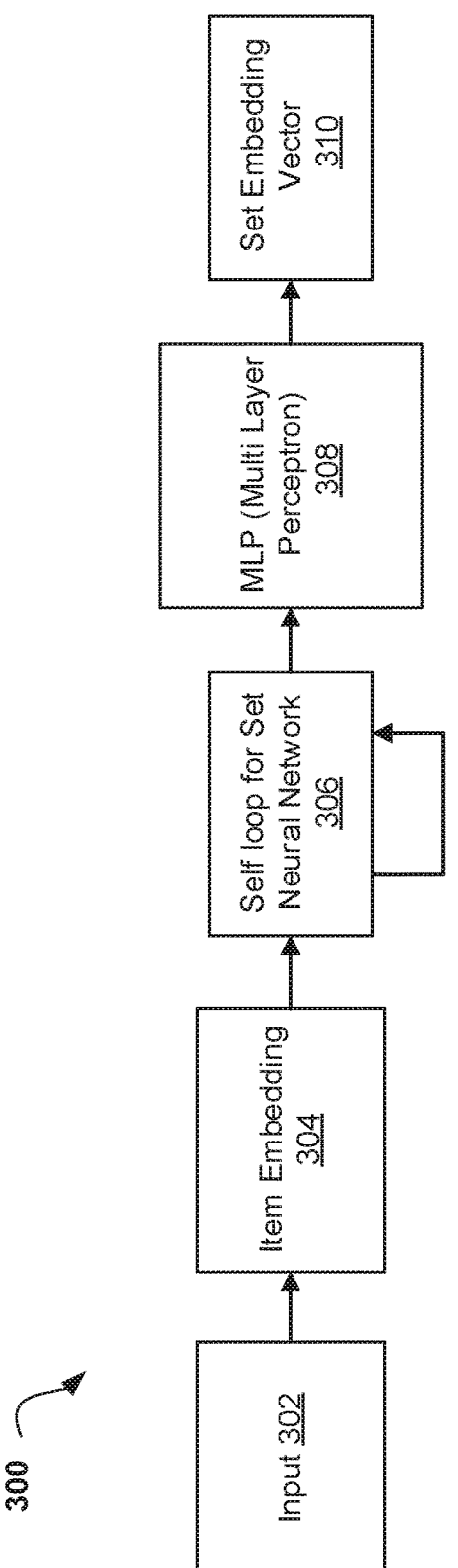
FIG. 3 is a functional block diagram of an automated feature engineering process according to at least one embodiment.

Referring now to FIG. 3, a functional block diagram of an automated feature engineering process 300 is depicted according to at least one embodiment. According to one embodiment, the automated feature engineering program 110A, 110B may generate input 302 with counts. For example, the input data may be represented as "oven ˆ1", "freezer ˆ1, "shelf ˆ1, "kitchen appliance ˆ2" and "furniture ˆ1". The automated feature engineering program 110A, 110B may then perform item embedding 304 by mapping a discrete variable to a vector of continuous values representing that discrete value. In the context of neural networks, embedding may be low-dimensional, learned continuous vector representations of discrete variable. The vectors of item embedding may then get updated while training a set-embedding neural network. In one embodiment, self loop for set neural network 306 may loop over each item and sum the embedding vectors of these items to create a sum vector. Multilayer perceptron 308 may then transform the sum vector to output the final vector representation of the input multi-set, we call this vector the embedding vector of the multi-set 310.

Figure 4:
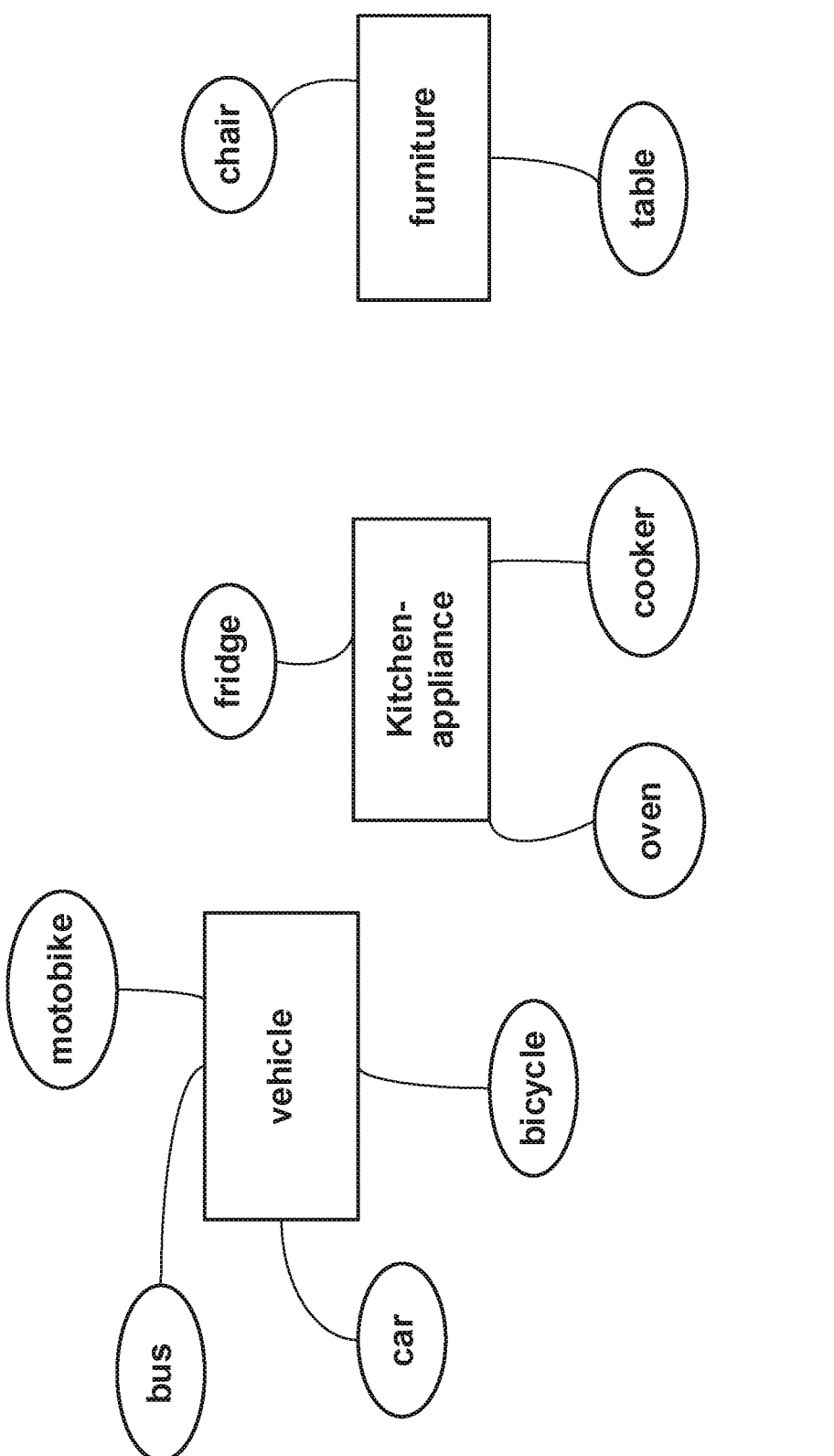
FIG. 4 is a block diagram of an exemplary knowledge graph according to at least one embodiment.

Referring now to FIG. 4, a block diagram of an exemplary knowledge graph is depicted according to at least one embodiment.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the automated feature engineering program 110A, 110B may allow a user to select one or more columns simultaneously to expand by associated concepts identified in external knowledge database.

Figure 5:
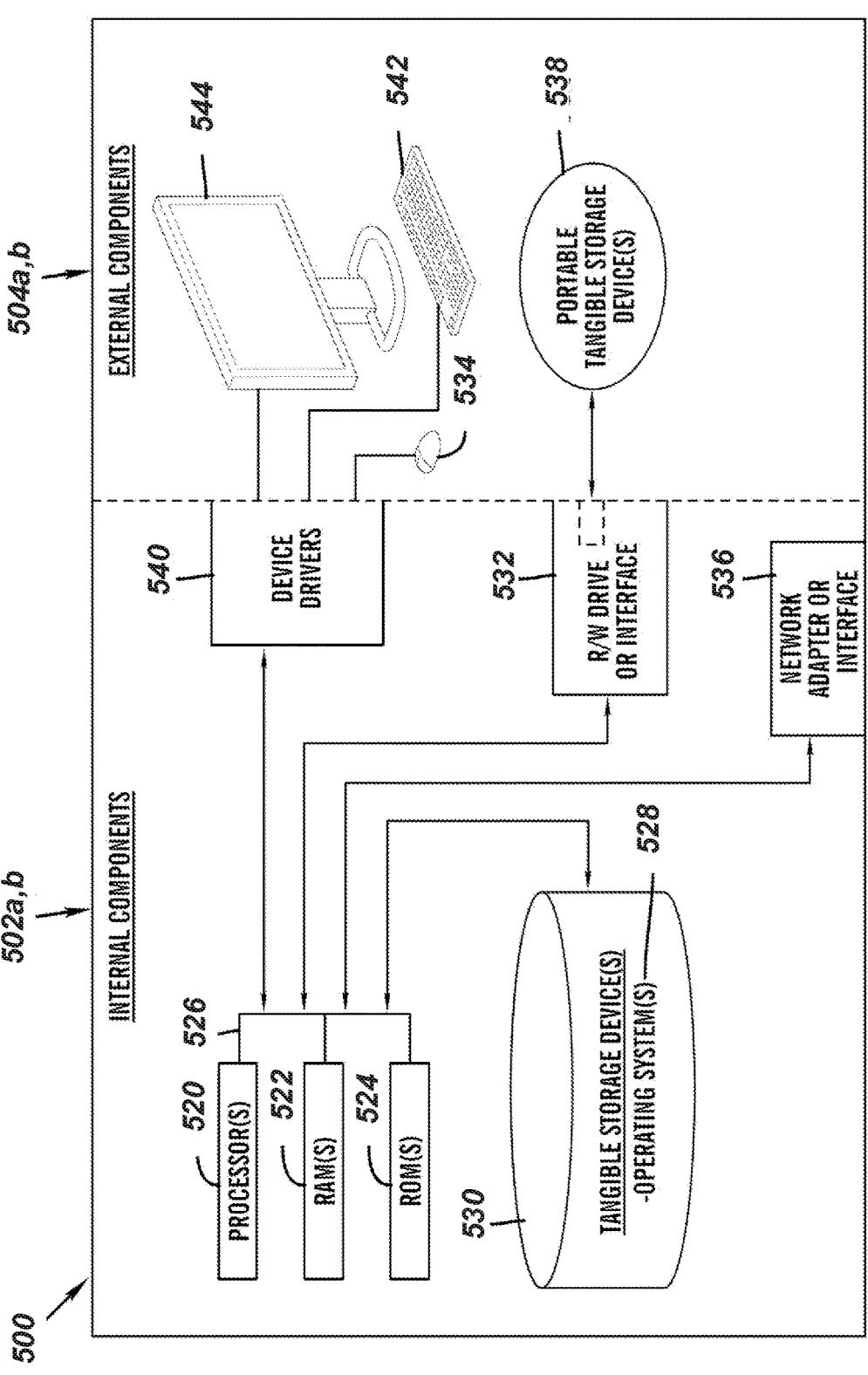
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a, b and external components 504 a, b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the automated feature engineering program 110A in the client computing device 102 and the automated feature engineering program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a, b also includes an RAY drive or interface 532 to read from and write to one or more portable computer-readable tangible storage devices 538 such as a CD-ROM, DVD, memory stick, magnetic tape, magnetic disk, optical disk or semiconductor storage device. A software program, such as the automated feature engineering program 110A, 110B can be stored on one or more of the respective portable computer-readable tangible storage devices 538, read via the respective R/W drive or interface 532 and loaded into the respective hard drive 530.

Each set of internal components 502 a, b also includes network adapters or interfaces 536 such as a TCP/IP adapter cards, wireless Wi-Fi interface cards, or 3G or 4G wireless interface cards or other wired or wireless communication links. The software program 108 and the automated feature engineering program 110A in the client computing device 102 and the automated feature engineering program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the automated feature engineering program 110A in the client computing device 102 and the automated feature engineering program 110B in the server 112 are loaded into the respective hard drive 530. The network may comprise copper wires, optical fibers, wireless transmission, routers, firewalls, switches, gateway computers and/or edge servers.

Each of the sets of external components 504 a, b can include a computer display monitor 544, a keyboard 542, and a computer mouse 534. External components 504 a, b can also include touch screens, virtual keyboards, touch pads, pointing devices, and other human interface devices. Each of the sets of internal components 502 a, b also includes device drivers 540 to interface to computer display monitor 544, keyboard 542, and computer mouse 534. The device drivers 540, RAY drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
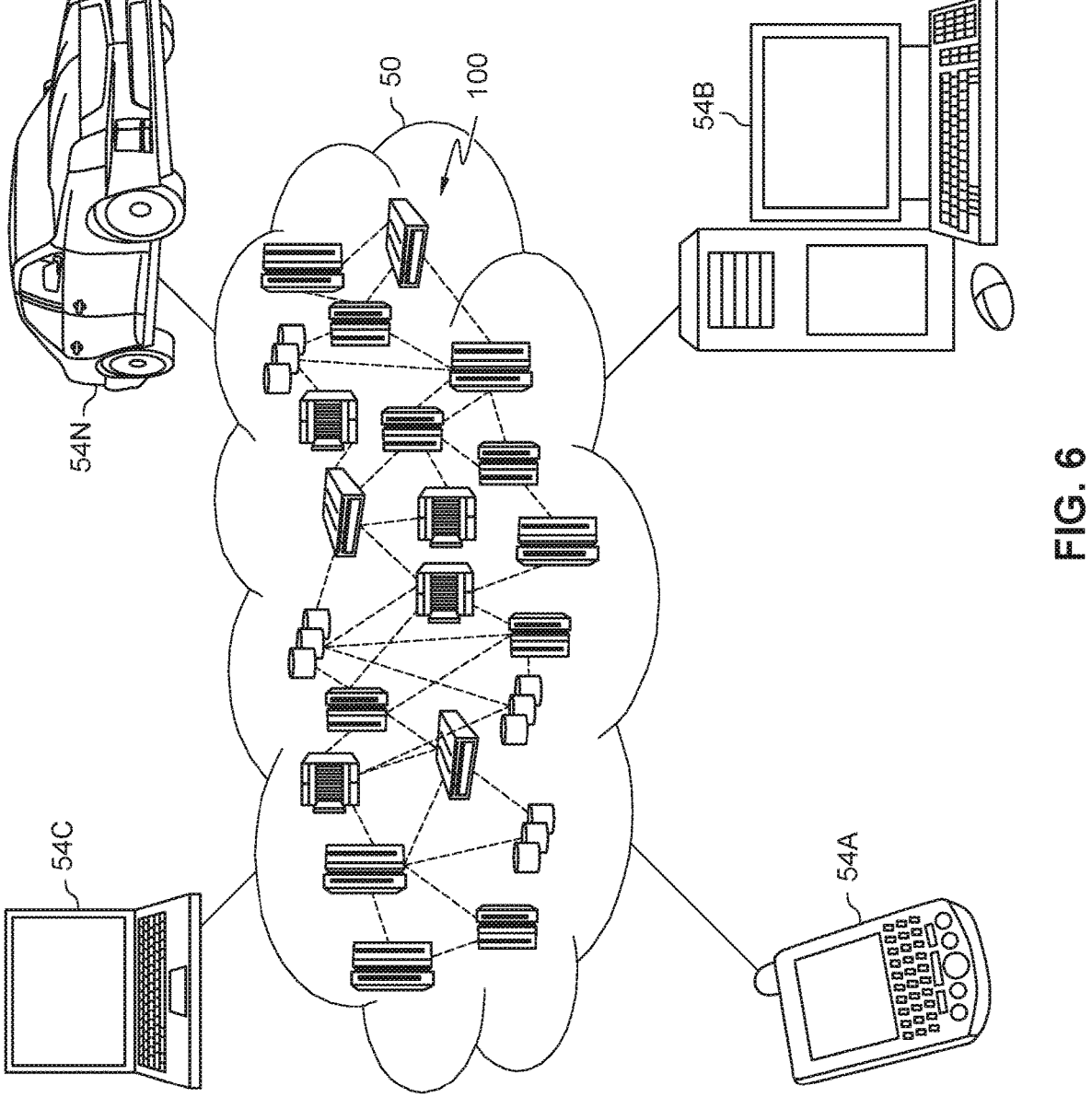
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
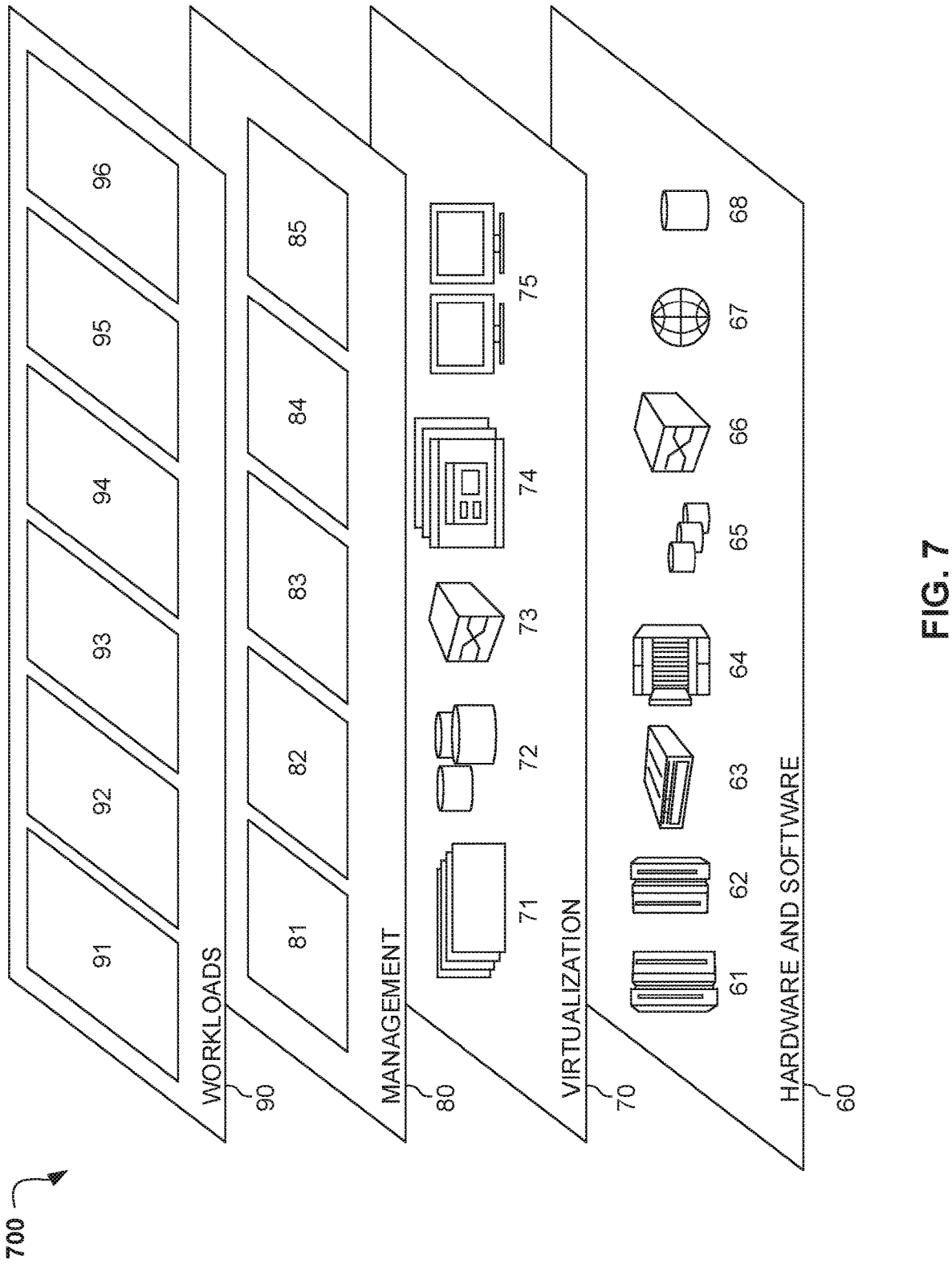
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated feature engineering 96. Automated feature engineering 96 may relate to automated enhancement of feature engineering via unsupervised learning of embedding of associated external knowledge.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for improving feature engineering utilizing unsupervised learning of associated external knowledge embedding without manual feature engineering from a data scientist, the method comprising:
   receiving, by a processor, input data as a table and a name of a column;
   identifying within the column multisets of concepts or sequences of concepts represented in natural language within the column;
   creating by the processor an expanded column by automatically expanding by the processor the column of the table by linking the identified natural language multisets of concepts or the sequences of the concepts with corresponding concepts in an external knowledge graph associated with an external knowledge base of specialized knowledge;
   training by the processor a neural network to learn embedding vectors associated with the concepts in the expanded column of the tables, wherein the training is unsupervised without provision of labels of data when the neural network learns the embedding vectors of the concepts in the expanded columns, the learned embedding vectors minimizing a reconstruction error of the concepts in the expanded columns; and
   utilizing by the processor the trained neural network and the learnt embedding vectors in a predictive analytic task or a data mining task associated with the natural language multisets or the sequences of the concepts.

2. The method of claim 1, further comprising:
prompting a user to select a column from the one or more columns that the user wants to expand.

3. The method of claim 1, further comprising:
receiving the external knowledge graph based on classification of the input data and training dataset into a concept.

4. The method of claim 1, further comprising:
extracting related concepts from the external knowledge graph.

5. The method of claim 1, further comprising:
utilizing a neural network structure to take a multi-set of data as input and output the embedding vector of the multi-set of the data.

6. The method of claim 1, further comprising:
utilizing an unsupervised learning method that trains a neural network structure on the expanded column by forcing the neural network structure to predict likelihood of items presenting in a given data set.

7. The method of claim 6, further comprising:
applying the unsupervised learning method to data clustering, anomaly detection and supervised problems, wherein the unsupervised learning method utilizes numerical vector representations of each set of the multi-set as an additional feature in addition to existing numerical feature in the table.

8. A computer system for improving feature engineering utilizing unsupervised learning of associated external knowledge embedding without manual feature engineering from a data scientist, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   receiving, by a processor, input data as a table and a name of a column;
   identifying within the column multisets of concepts or sequences of concepts represented in natural language within the column;
   creating by the processor an expanded column by automatically expanding by the processor the column of the table by linking the identified natural language multisets of concepts or the sequences of the concepts with corresponding concepts in an external knowledge graph associated with an external knowledge base of specialized knowledge;
   training by the processor a neural network to learn embedding vectors associated with the concepts in the expanded column of the tables, wherein the training is unsupervised without provision of labels of data when the neural network learns the embedding vectors of concepts in the expanded columns, the learned embedding vectors minimizing reconstruction error of the of concepts in the expanded columns; and
   utilizing by the processor the trained neural network and the learnt embedding vectors in a predictive analytic task or a data mining task associated with the natural language multisets or the sequences of the concepts.

9. The computer system of claim 8, further comprising:
prompting a user to select a column from the one or more columns that the user wants to expand.

10. The computer system of claim 8, further comprising:
receiving the external knowledge graph based on classi-
fication of the input data and training dataset into a
concept.

11. The computer system of claim 8, further comprising:
extracting related concepts from the external knowledge
graph.

12. The computer system of claim 8, further comprising:
utilizing a neural network structure to take a multi-set of
data as input and output an embedding vector of the
multi-set of the data.

13. The computer system of claim 8, further comprising:
utilizing an unsupervised learning method that trains a
neural network structure on the expanded column by
forcing the neural network structure to predict likeli-
hood of items presenting in a given data set.

14. The computer system of claim 13, further comprising:
applying the unsupervised learning method to data clus-
tering, anomaly detection and supervised problems,
wherein the unsupervised learning method utilizes
numerical vector representations of each set of the
multi-set as an additional feature in addition to existing
numerical feature in the table.

15. A computer program product for improving feature
engineering utilizing unsupervised learning of associated
external knowledge embedding without manual feature
engineering from a data scientist, the computer program
product comprising:
one or more computer-readable tangible storage media
and program instructions stored on at least one of the
one or more tangible storage media, the program
instructions executable by a processor of a computer to
perform a method, the method comprising:
receiving, by a processor, input data as a table and a name
of a column;
identifying within the column multisets of concepts or
sequences of concepts represented in natural language
within the column;
creating by the processor an expanded column by auto-
matically expanding by the processor the column of the
table by linking the identified natural language multi-
sets of concepts or the sequences of the concepts with corresponding concepts in an external knowledge
graph associated with an external knowledge base of
specialized knowledge;
training by the processor a neural network to learn embed-
ding vectors associated with the concepts of in the
expanded column of the tables, wherein the training is
unsupervised without provision of labels of data when
the neural network learns the embedding vectors of the
concepts in the expanded columns, the learned embed-
ding vectors minimizing a reconstruction error of the of
concepts in the expanded columns; and
utilizing by the processor the trained neural network and
the learnt embedding vectors in a predictive analytic
task or a data mining task associated with the natural
language multisets or the sequences of the concepts.

16. The computer program product of claim 15, further
comprising:
prompting a user to select a column from the one or more
columns that the user wants to expand.

17. The computer program product of claim 15, further
comprising:
receiving the external knowledge graph based on classi-
fication of the input data and training dataset into a
concept.

18. The computer program product of claim 15, further
comprising:
utilizing a neural network structure to take a multi-set of
data as input and output an embedding vector of the
multi-set of the data.

19. The computer program product of claim 15, further
comprising:
utilizing an unsupervised learning method that trains a
neural network structure on the expanded column by
forcing the neural network structure to predict likeli-
hood of items presenting in a given data set.

20. The computer program product of claim 19, further
comprising:
applying the unsupervised learning method to data clus-
tering, anomaly detection and supervised problems,
wherein the unsupervised learning method utilizes
numerical vector representations of each set of the
multi-set as an additional feature in addition to existing
numerical feature in the table.

* * * * *